Re 6914 2-08-1876
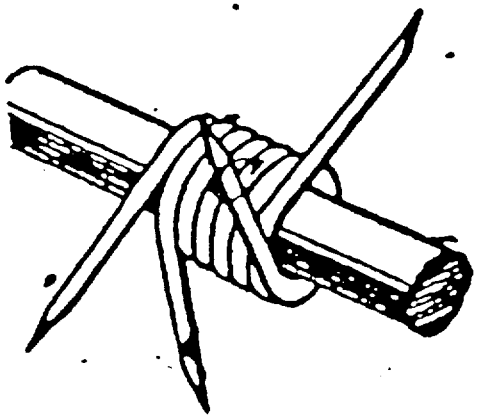

UNITED STATES PATENT OFFICE.

JOSEPH F. GLIDDEN, OF DE KALB, ILLINOIS.

IMPROVEMENT IN BARBED FENCE-WIRES.

Specification forming part of Letters Patent No. 150,683, dated May 12, 1874; Reissue No. 6,914, dated February 8, 1876. Application filed January 26, 1876.

DIVISION B.

*To all whom it may concern:*

Be it known that I, JOSEPH F. GLIDDEN, of De Kalb, in the county of De Kalb and State of Illinois, have invented a new and useful Improvement in Wire Fences, of which the following is a full, clear, and exact description.

Figure 1 of the drawing is a perspective detail view of my wire and barbs as completed, and Fig. 2 is a side view of the same.

This division of my invention has relation to a mode of applying coiled-wire barbs to fence-wires, so that the points or barbs will be presented in several directions, and thus more effectually guard against animals breaking down the fence; and the nature of my invention consists in the employment of two wires coiled together around a fence-wire, the ends of which wires are pointed and adjusted in different directions, as will be better understood from the following description.

In the drawings accompanying this division of my application, A designates a fence-wire of any suitable diameter and shape, and B C designate barbs, which are bent in different directions. These barbs or spurs are the pointed ends of two wires, which are bent around the fence-wire A, so as to form the coils D, shown in Figs. 1 and 2.

It is obvious that by the use of two wires coiled and barbed, as described above, the barbed ends can be adjusted at any desired angle with relation to the fence-wire and to themselves; hence I am enabled to use round wire, although I do not confine myself to this kind of wire.

What I claim as new, and desire to secure by Letters Patent, is—

In combination with a fence-wire, a barb formed of two short pieces of pointed wire, secured in place upon the fence-wire by coiling between their ends, which are extended to present four points in different directions, substantially as specified.

In testimony that I claim the above I have hereunto subscribed my name in the presence of two witnesses.

JOSEPH F. GLIDDEN.

Attest:
JOHN F. ACKER,
GEORGE E. UPHAM.